US011136051B2

(12) United States Patent
Taga et al.

(10) Patent No.: US 11,136,051 B2
(45) Date of Patent: Oct. 5, 2021

(54) RAILCAR AXLE BOX AND METHOD OF PRODUCING THE SAME

(71) Applicant: KAWASAKI JUKOGYO KABUSHIKI KAISHA, Kobe (JP)

(72) Inventors: Yukitaka Taga, Kobe (JP); Fumikazu Kounoike, Kakogawa (JP); Yukihiro Sano, Kobe (JP); Takaya Ono, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 575 days.

(21) Appl. No.: 16/065,978

(22) PCT Filed: Nov. 29, 2016

(86) PCT No.: PCT/JP2016/005007

§ 371 (c)(1),
(2) Date: Jun. 25, 2018

(87) PCT Pub. No.: WO2017/110047

PCT Pub. Date: Jun. 29, 2017

(65) Prior Publication Data

US 2019/0084596 A1 Mar. 21, 2019

(30) Foreign Application Priority Data

Dec. 25, 2015 (JP) ............................ JP2015-252982

(51) Int. Cl.
*B61F 15/06* (2006.01)
*B61F 5/30* (2006.01)
(Continued)

(52) U.S. Cl.
CPC ................ *B61F 15/06* (2013.01); *B22D 7/00* (2013.01); *B22D 25/00* (2013.01); *B23P 15/20* (2013.01);
(Continued)

(58) Field of Classification Search
CPC .. B61F 15/00; B61F 15/06; B61F 5/00; B61F 5/30; B61F 19/00; B61F 3/02; B22D 7/00; B22D 25/00; B23P 15/20
See application file for complete search history.

(56) References Cited

U.S. PATENT DOCUMENTS 2,264,249 A * 11/1941 Shoemaker ............ B61F 15/02 384/191.2
2,690,361 A * 9/1954 Bassett .................. B61F 15/06 384/158
(Continued)

FOREIGN PATENT DOCUMENTS

JP H10-278791 A 10/1998
JP 2003-205840 A 7/2003
(Continued)

*Primary Examiner* — Jason C Smith
(74) *Attorney, Agent, or Firm* — Oliff PLC

(57) ABSTRACT

A railcar axle box includes an axle box main body accommodating a bearing supporting an axle. The axle box main body includes: an inner surface defining an accommodating space accommodating the bearing; a first side surface provided at an outer side of the inner surface and at one car width direction side of a car width direction center of the accommodating space; and a second side surface provided at an outer side of the inner surface and at the other car width direction side of the center. A shortest distance between the first side surface and the car width direction center of the accommodating space and a shortest distance between the second side surface and the center are equal to each other in a car width direction.

6 Claims, 8 Drawing Sheets

1 30 2 3 4 5 5a 5a 21 11 7 6 20 10 16 8 A 15 12 16 17 13 5b 5b 13 17 16 12 15 A 8 16 10 6 7 20 11 21

CAR LONGITUDINAL DIRECTION

(51) Int. Cl.

| | |
|---|---|
| ***B61F 5/00*** | (2006.01) |
| ***B61F 19/00*** | (2006.01) |
| ***B61F 15/00*** | (2006.01) |
| ***B23P 15/20*** | (2006.01) |
| ***B22D 7/00*** | (2006.01) |
| ***B22D 25/00*** | (2006.01) |
| ***B61F 3/02*** | (2006.01) |

(52) U.S. Cl.
CPC .................. *B61F 5/00* (2013.01); *B61F 5/30* (2013.01); *B61F 15/00* (2013.01); *B61F 19/00* (2013.01); *B61F 3/02* (2013.01)

(56) References Cited

U.S. PATENT DOCUMENTS 2,833,600 A * 5/1958 Lyons .................... B61F 15/06 384/191.2
3,363,951 A * 1/1968 Rykoskey ............... F16C 33/24 384/160
3,684,331 A * 8/1972 Hennessy, Jr. .......... B61F 15/02 384/186
2011/0253004 A1* 10/2011 Nishimura ................ F16F 1/38 105/220
2018/0033222 A1* 2/2018 Mitsue ................. G07C 5/0808
2019/0009798 A1* 1/2019 Taga ......................... B61F 5/32
2019/0084596 A1* 3/2019 Taga ........................ B22D 7/00
2019/0162604 A1* 5/2019 Ono ......................... G01K 1/14

FOREIGN PATENT DOCUMENTS

JP 2009-202855 A 9/2009
JP 2010-184684 A 8/2010
JP 2012-237337 A 12/2012
JP 2014-037191 A 2/2014

* cited by examiner

RAILCAR AXLE BOX AND METHOD OF PRODUCING THE SAME

TECHNICAL FIELD

The present invention relates to a railcar axle box and a method of producing the axle box.

BACKGROUND ART

In a railcar bogie, axle boxes accommodating respective bearings supporting an axle are provided at both respective car width direction sides of the axle (see PTL 1, for example). The axle box is produced by: forging of metal, such as an aluminum alloy; or casting performed by pouring molten metal into a die.

CITATION LIST

Patent Literature

PTL 1: Japanese Laid-Open Patent Application Publication No. 10-278791

SUMMARY OF INVENTION

Technical Problem

Such axle box has a structure asymmetrical in a car width direction. Four axle boxes are provided for each bogie, and there are two types of axle boxes that are an axle box (left hand) arranged at a left side in a side view and an axle box (right hand) arranged at a right side in a side view.

Specifically, for example, a cover member of the axle box accommodating the bearing is provided at one car width direction side of the axle box (i.e., at a car width direction outer side of the axle box). In this case, an insertion hole for fixing the cover member by a bolt is formed only at the car width direction outer side of the axle box by machine work.

A horizontal surface chucked by a pushing-up device, such as a jack, is provided at an upper surface of the axle box. The horizontal surface is provided at one car width direction side of the upper surface of the axle box.

As above, the conventional axle box has a structure asymmetrical in the car width direction. Therefore, the left-hand axle box and the right-hand axle box need to be managed as separate components although both are the axle boxes, and a problem is that management cost is high.

Further, to produce plural types of axle boxes, dies corresponding to the number of types of the axle boxes need to be prepared, so that another problem is that cost for the dies increases.

An object of the present invention is to reduce component management cost and production cost when producing a railcar axle box.

Solution to Problem

A method of producing a railcar axle box according to one aspect of the present invention is a method of producing a railcar axle box, the axle box including an axle box main body accommodating a bearing supporting an axle, the method including: a casting step of molding an axle box preform by casting, the axle box preform having a shape symmetrical in a car width direction and including an accommodating space accommodating the bearing; and a working step of subjecting the axle box preform to machine work to form the axle box main body.

According to the above method, the axle box preform including the accommodating space accommodating the bearing is molded in a shape symmetrical in the car width direction. With this, when producing a pair of axle box main bodies provided at both respective car width direction sides of the axle, the types of the axle box preform can be reduced, and the cost for the dies can be reduced by communalizing the dies. Therefore, when producing the axle box main body of the railcar bogie, the types of the components and the production cost can be reduced.

A railcar axle box according to one aspect of the present invention includes an axle box main body accommodating a bearing supporting an axle, the axle box main body including an inner surface defining an accommodating space accommodating the bearing, a first side surface provided at an outer side of the inner surface and at one car width direction side of a car width direction center of the accommodating space, and a second side surface provided at the outer side of the inner surface and at the other car width direction side of the center, a shortest distance between the first side surface and the center and a shortest distance between the second side surface and the center being equal to each other in a car width direction.

According to the above configuration, the axle box preforms each having a shape symmetrical in the car width direction are cast by the common die, and the axle box main bodies can be easily produced. Therefore, the suitable axle boxes by which the types of the components and the production cost can be reduced when producing the axle box main bodies can be provided.

Advantageous Effects of Invention

According to the present invention, the component management cost and the production cost can be reduced when producing the railcar axle box.

DESCRIPTION OF EMBODIMENTS

Figure 1:
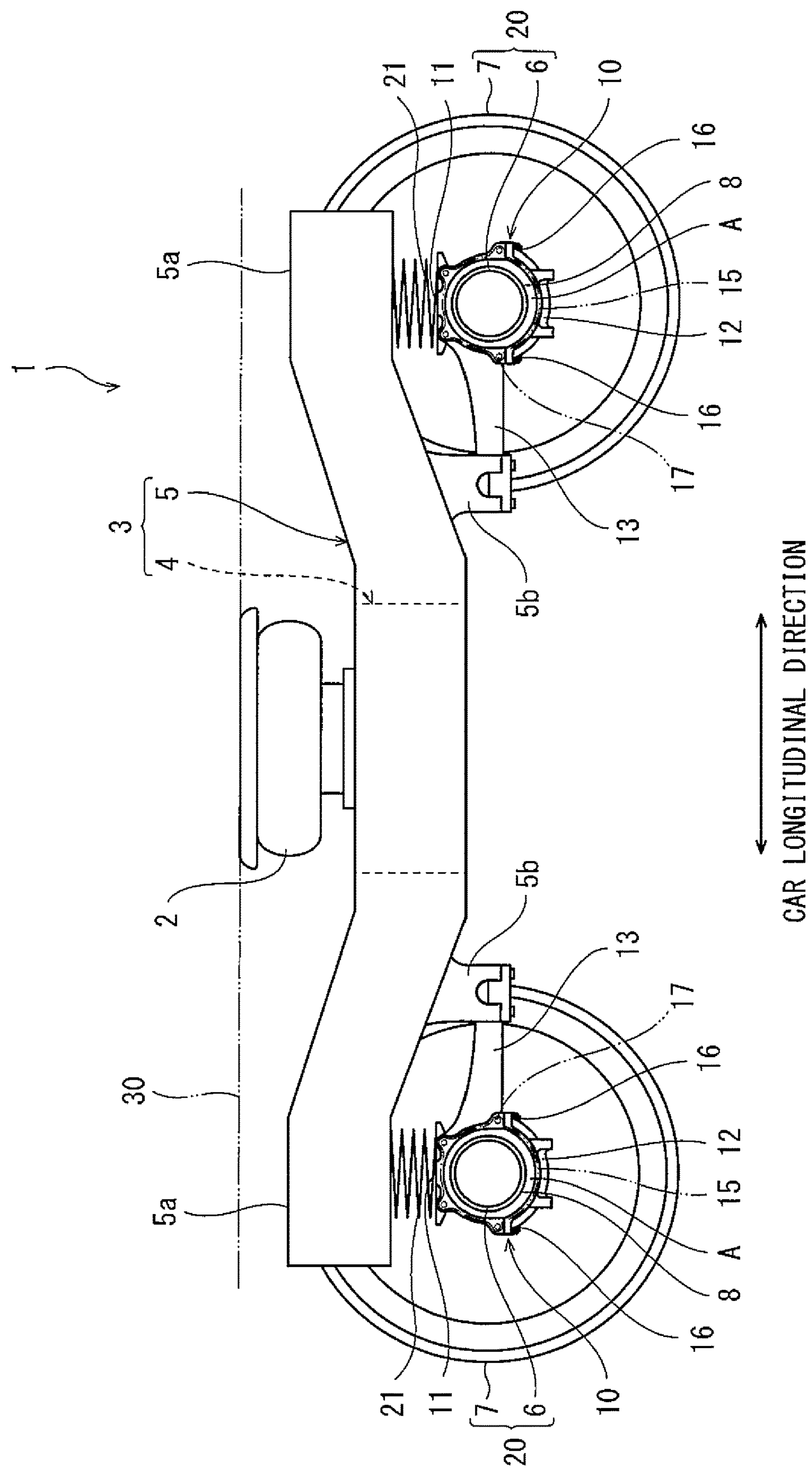
FIG. 1 is a side view of a railcar bogie including an axle box according to Embodiment 1.

Hereinafter, embodiments will be explained with reference to the drawings. In the drawings, the same reference signs are used for the same or corresponding components, and a repetition of the same explanation is avoided.

Embodiment 1

FIG. 1 is a side view of a railcar bogie 1 of an axle box 10 according to Embodiment 1. In FIG. 1, for convenience of explanation, a paper surface near side, a paper surface far side, a paper surface left side, and a paper surface right side may be referred to as "left," "right," "front," and "rear," respectively. As shown in FIG. 1, the railcar bogie (hereinafter referred to as a "bogie") 1 includes a bogie frame 3 supporting a carbody 30 through an air spring 2. The bogie frame 3 includes: a cross beam 4 extending in a car width direction at a car longitudinal direction middle of the bogie 1; and side sills 5 extending in a car longitudinal direction from both respective car width direction end portions of the cross beam 4.

A pair of axles 6 each extending in the car width direction are arranged at both respective car longitudinal direction sides of the bogie frame 3. Wheels 7 are press-fitted to both respective car width direction sides of each of the axles 6. The axle 6 and the wheels 7 constitute a wheelset 20. A pair of wheelsets 20 provided at the bogie 1 are arranged at both respective car longitudinal direction sides of the bogie frame 3 so as to be spaced apart from each other. Bearings 8 rotatably supporting the wheels 7 are provided at both respective car width direction end portions of each axle 6 so as to be located outside the wheels 7 in the car width direction. The bearings 8 are accommodated in respective axle box main bodies 11 of the axle boxes 10. The axle box main body 11 is elastically coupled to the bogie frame 3 by an axle beam 13 and an axle spring 21, the axle beam 13 being formed integrally with the axle box 10.

The axle box 10 includes the axle box main body 11, a cover body 12, the axle beam 13, and a lid 15. The axle box main body 11 is a member covering the bearing 8 from above, and the cover body 12 is a member covering the bearing 8 from below. The axle box main body 11 is connected to a car longitudinal direction end portion 5*a* of the side sill 5 in an upward/downward direction by the axle spring 21. The cover body 12 is fixed to the axle box main body 11 by fastening members 16, such as bolts. By attaching the cover body 12 to the axle box main body 11 as above, an accommodating space A accommodating the bearing 8 and having a completely circular column shape is formed.

The axle beam 13 couples the axle box main body 11 and the side sill 5 in the car longitudinal direction. Specifically, the axle beam 13 molded integrally with the axle box main body 11 extends from the axle box main body 11 toward the cross beam 4 in the car longitudinal direction. A tip end portion of the axle beam 13 is elastically coupled to a receiving seat 5*b* of the side sill 5 through a rubber bushing and a core rod (not shown).

The lid 15 is a member covering the axle 6 and the bearing 8 from a car width direction outer side. The lid 15 is attached to the axle box main body 11 by a plurality of fastening members 17 (for example, bolts) from the car width direction outer side. The lid 15 is an adapter for attaching a grounding device or a speed generator according to need. The lid 15 does not have to be provided at the bogie 1.

Figure 2:
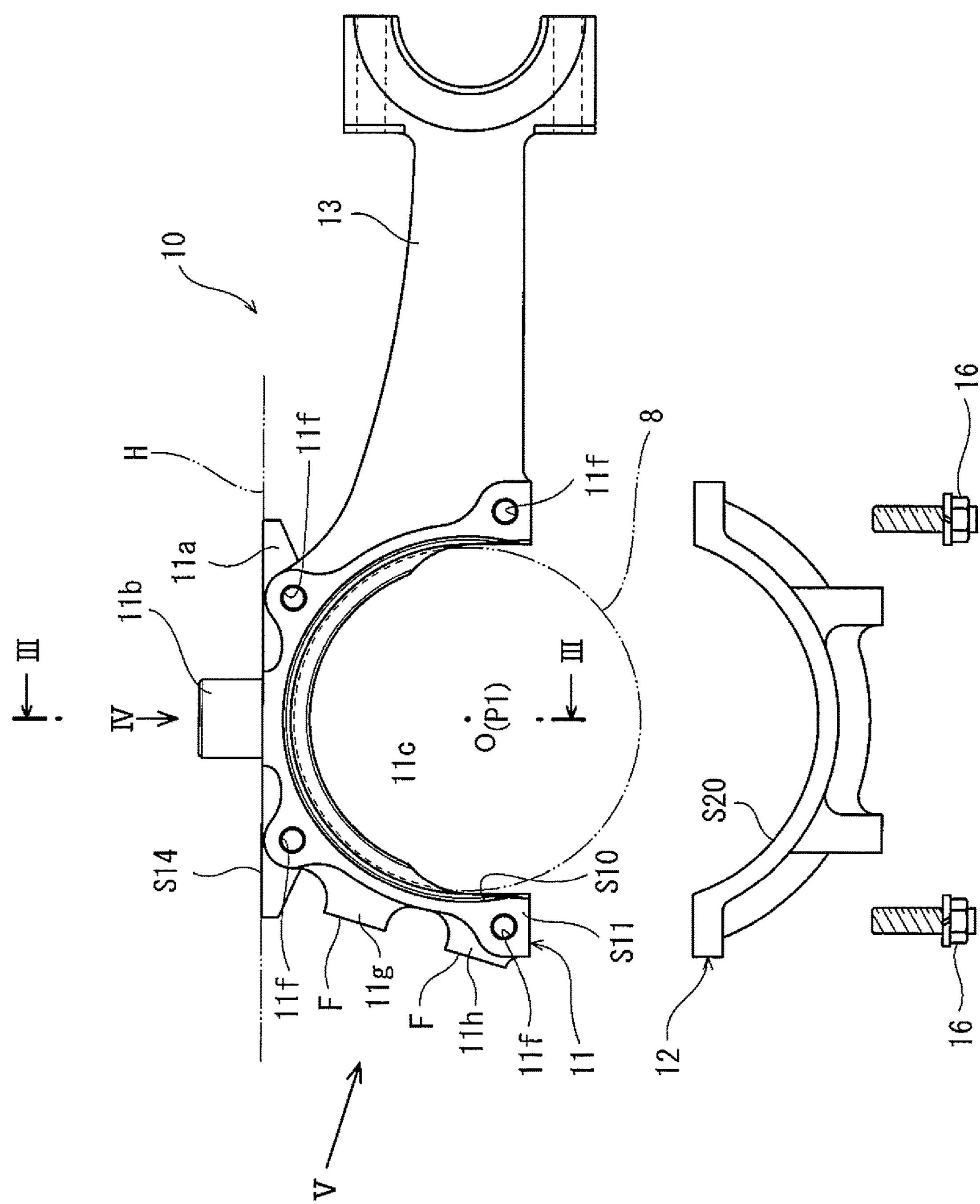
FIG. 2 is an exploded side view showing that a lid of the axle box shown in FIG. 1 is detached.

FIG. 2 is an exploded side view showing that the lid 15 of the axle box 10 shown in FIG. 1 is detached. As shown in FIG. 2, the axle box 10 is divided into: the axle box main body 11 molded integrally with the axle beam 13; and the cover body 12. In a side view, each of an inner surface S10 of the axle box main body 11 and an inner surface S20 of the cover body 12 has a shape corresponding to a part of a perfect circle about an axle center O.

The axle box main body 11 includes a spring seat 11*a* at an upper portion thereof. An upper surface S14 of the spring seat 11*a* is a supporting surface supporting the axle spring 21 and forms an upper surface of the axle box main body 11. A substantially columnar projecting portion 11*b* projects upward from the supporting surface S14. In a plan view, the projecting portion 11*b* overlaps an axis P2 extending in the car longitudinal direction through a car width direction center C of the accommodating space A (hereinafter simply referred to as "the center C of the accommodating space A") (see FIGS. 3 and 4). It should be noted that the projecting portion 11*b* and the center C of the accommodating space A do not have to coincide with each other, and the projecting portion 11*b* and the accommodating space A may be offset from each other. By inserting the projecting portion 11*b* into a through hole (not shown) formed at a lower surface of the axle spring 21 (see FIG. 1), the axle spring 21 is positioned on the upper surface S14 of the axle box main body 11.

Figure 3:
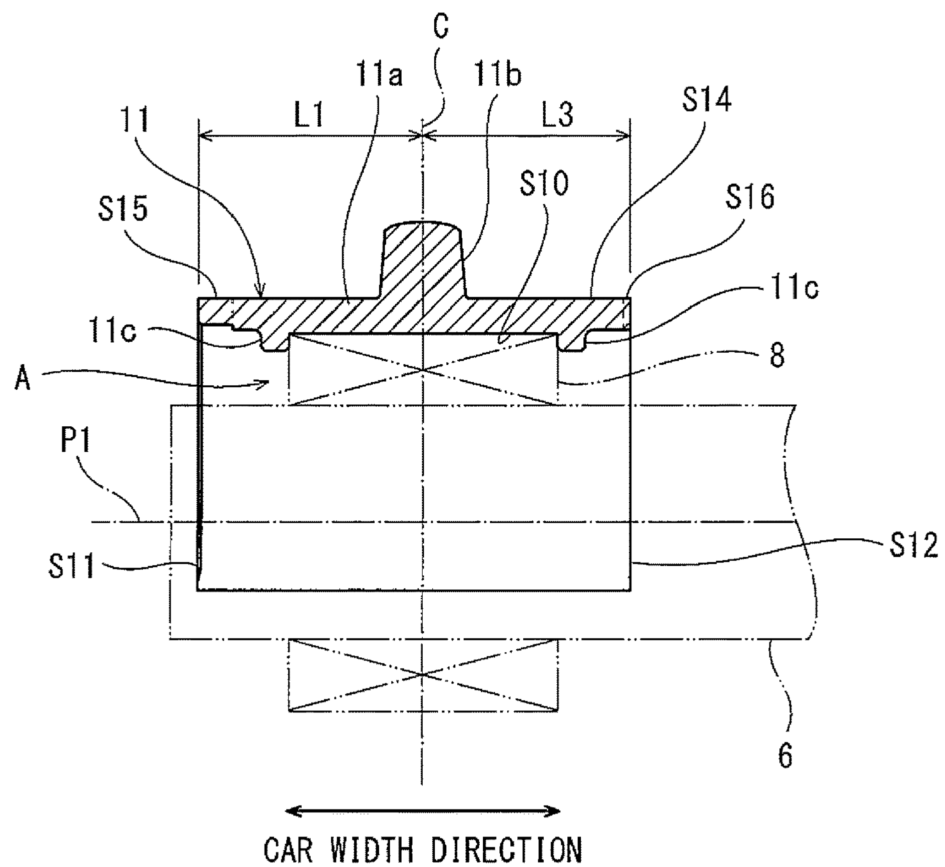
FIG. 3 is a sectional view taken along line III-III of FIG. 2.

FIG. 3 is a sectional view taken along line III-III of FIG. 2. As shown in FIG. 3, an upper portion of the bearing 8 is accommodated at a car width direction substantially middle of the axle box main body 11. The axle box main body 11 includes a pair of flange portions 11*c* partially projecting from the inner surface S10 inward in a radial direction. In a side view, the flange portion 11*c* has a circular-arc shape (see FIG. 2). The bearing 8 accommodated in the axle box main body 11 is positioned by being sandwiched by the pair of flange portions 11*c* from both car width direction sides.

Figure 4:
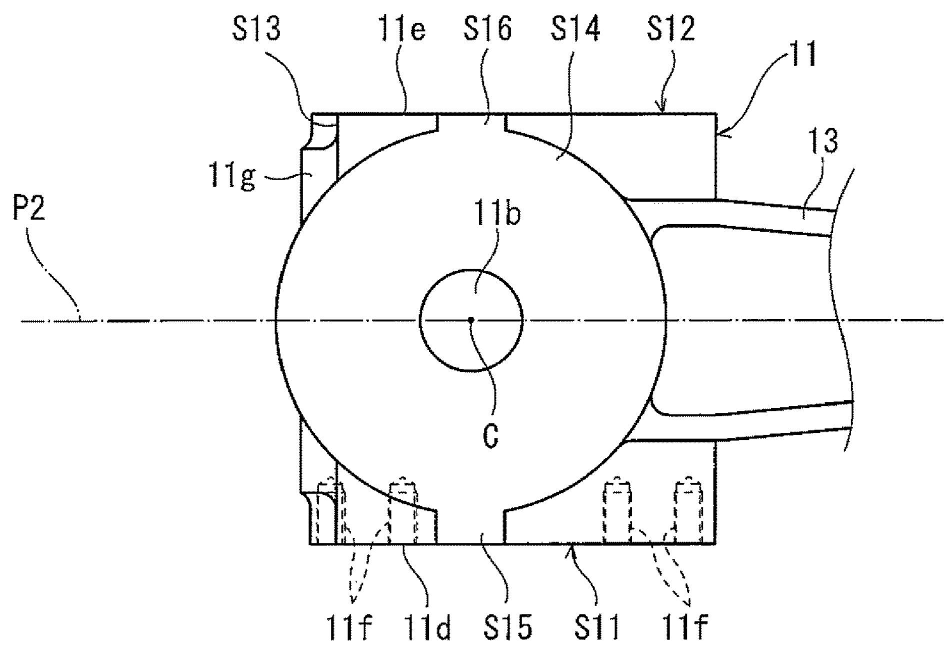
FIG. 4 is a diagram when viewed from a direction indicated by an arrow IV of FIG. 2.

FIG. 4 is a diagram when viewed from a direction indicated by an arrow IV of FIG. 2. As shown in FIGS. 3 and 4, the axle box main body 11 includes: a first side surface S11 located at a car width direction outer side of the car width direction center C; and a second side surface S12 located at a car width direction inner side of the center C.

A flat first seat surface portion 11*d* is formed at the first side surface S11 of the axle box main body 11. A flat second seat surface portion 11*e* having the same contour as the first seat surface portion 11*d* of the first side surface S11 is formed at the second side surface S12. Since the lid 15 is attached to the first side surface S11 by the bolts 17 (see FIG. 1), a plurality of internal threads 11*f* with which external threads of the bolts 17 are threadedly engaged are formed at the first side surface S11. By attaching the lid 15 to the first side surface S11, the lid 15 closes the accommodating space A of the axle box main body 11 from a car width direction outer side. The lid 15 is not attached to the second side surface S12 located at the car width direction inner side. Therefore, unlike the first seat surface portion 11*d*, internal threads are not formed at the second seat surface portion 11*e* of the second side surface S12.

Further, a first horizontal surface S15 and a second horizontal surface S16 are provided at an upper portion of the axle box main body 11. The first horizontal surface S15 is located at a car width direction outer side of the spring seat 11*a* and is chucked by a pushing-up device, such as a hydraulic jack. The second horizontal surface S16 is located at a ear width direction inner side of the spring seat 11*a*. Each of the first horizontal surface S15 and the second horizontal surface S16 has a rectangular shape that is long in the car longitudinal direction. A car width direction size of the second horizontal surface S16 is smaller than a car width direction size of the first horizontal surface S15. Each of the first horizontal surface S15 and the second horizontal surface S16 is provided at the same position as the supporting surface S14 in the upward/downward direction.

With this configuration, in wheel grinding work in which the wheel 7 unevenly worn by, for example, traveling of the railcar is ground in a non-dismantling state, the first horizontal surface S15 of the axle box main body 11 of the axle box 10 is chucked by a jack of a wheel lathe apparatus, and the axle box 10 supporting the wheelset 5 is pushed upward by the jack. With this, a wheel tread of the wheel 7 can be ground from below.

Figure 5:
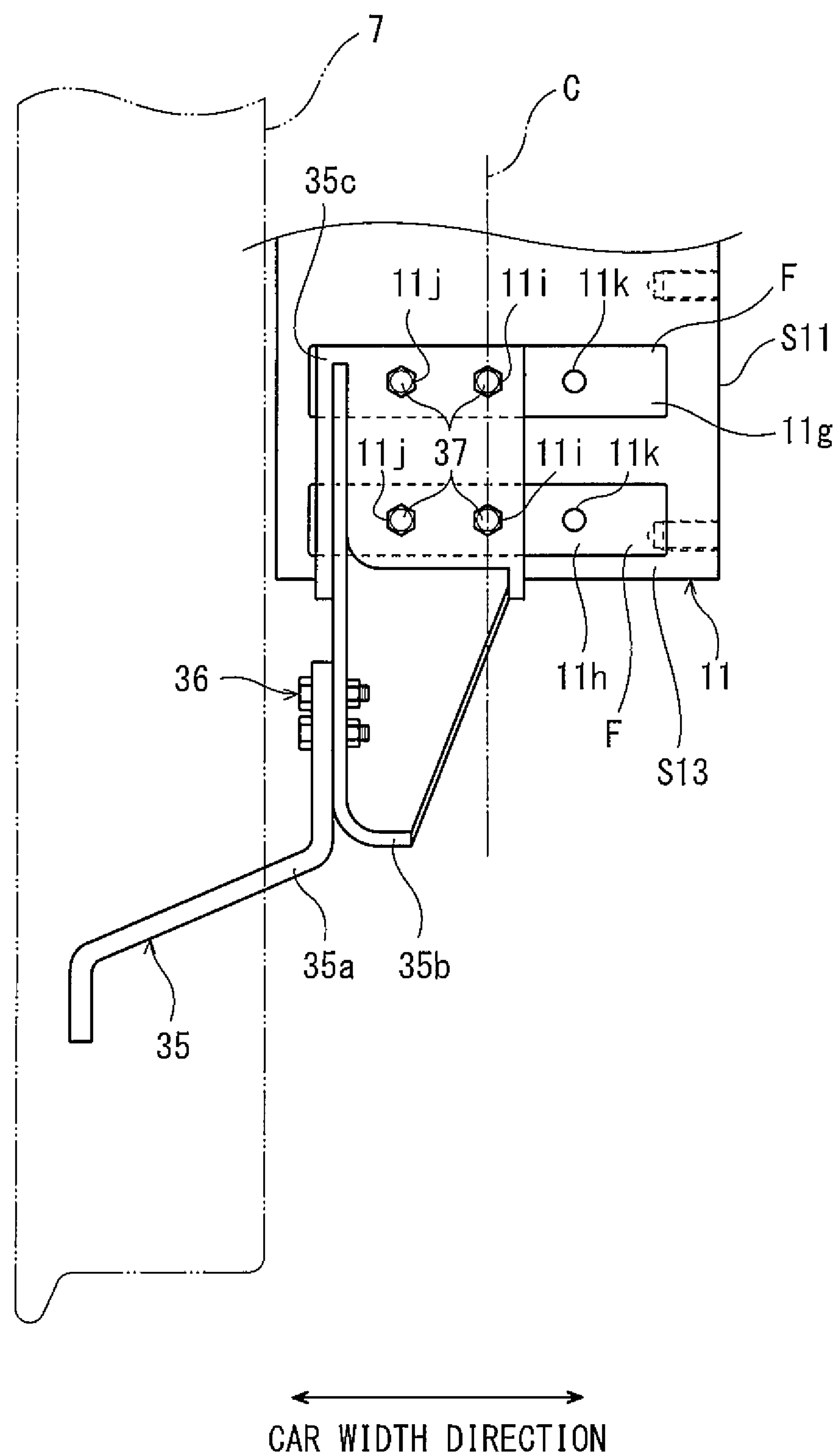
FIG. 5 is a diagram when viewing an axle box main body, to which an obstacle deflector is attached, from a direction V of FIG. 2.

FIG. 5 is a diagram when viewing the axle box main body 11, to which an obstacle deflector 35 is attached, from a direction V of FIG. 2. As shown in FIG. 5, the obstacle deflector 35 includes: an obstacle deflecting portion 35*a* overlapping the wheel 7 when viewed from the car longitudinal direction; and a coupling portion 35*b* coupling the obstacle deflecting portion 35*a* and the axle box main body 11. The obstacle deflecting portion 35*a* is fixed to the coupling portion 35*b* by fastening members 36 (for example, bolts and nuts). The coupling portion 35*b* includes a plate-shaped attaching fitting 35*c* attached to the axle box main body 11. The attaching fitting 35*c* is attached to receiving seats 11*g* and 11*h* of the axle box main body 11 by a plurality of fastening members 37 (for example, bolts).

The receiving seats 11*g* and 11*h* are provided at a side surface S13 of an outer surface of the axle box main body 11, the side surface S13 being located at a car longitudinal direction outer side of the center C of the accommodating space A. When viewed from a car longitudinal direction outer side, each of the receiving seats 11*g* and 11*h* has a substantially rectangular shape that is long in the car width direction and is formed in a shape symmetrical in the car width direction based on the center C of the accommodating space A. The receiving seats 11*g* and 11*h* includes respective fastening surfaces F to which the coupling portion 35*b* of the obstacle deflector 35 is fastened by the bolts 37. The receiving seats 11*g* and 11*h* are arranged such that the fastening surfaces F are inclined with respect to the side surface S13 obliquely downward toward a car longitudinal direction outer side (see FIG. 2). A plurality of insertion holes 11*i* to 11*k* into which the bolts 37 are inserted are provided on the fastening surfaces F.

Internal threads with which external threads of the bolts 37 are threadedly engaged are formed at the insertion holes 11*i* to 11*k*. To be specific, in the present embodiment, the insertion holes 11*i* to 11*k* are threaded holes. The plurality of threaded holes 11*i* to 11*k* are arranged symmetrically in the car width direction based on the center C of the accommodating space A. Specifically, among the plurality of threaded holes 11*i* to 11*k*, the first threaded hole 11*i* is formed so as to overlap the center C of the accommodating space A when viewed from a car longitudinal direction outer side. The second threaded hole 11*j* and the third threaded hole 11*k* are formed at both respective car width direction sides of the first threaded hole 11*i*. Each of the second threaded hole 11*j* and the third threaded hole 11*k* is arranged with an interval from the first threaded hole 11*i* in the car width direction, and the interval between the second threaded hole 11*j* and the first threaded hole 11*i* and the interval between the third threaded hole 11*k* and the first threaded hole 11*i* are equal to each other.

Four through holes through which the bolts 37 penetrate are formed at the attaching fitting 35*c* of the coupling portion 35*b*. In the axle box main body 11 of the axle box 10 located at a front left side as in the present embodiment, the four through holes of the attaching fitting 35*c* are arranged so as to overlap the first insertion holes 11*i* and second insertion holes 11*j* of the receiving seats 11*g* and 11*h* in the car longitudinal direction. Then, the coupling portion 35*b* is fixed by the bolts 37. With this, the obstacle deflector 35 can be attached to the receiving seats 11*g* and 11*h*, each having a shape symmetrical in the car width direction, so as to be located at a car width direction inner side, i.e., located close to the wheel (in the present embodiment, located at a leftward/rightward direction right side).

Next, a method of producing the axle box 10 will be explained. The axle box main body 11 of the axle box 10 is produced through a casting step and a working step. In the casting step, an axle box preform 51 (see FIGS. 6 and 7) is molded by casting, i.e., by pouring a molten metal material (for example, carbon steel) to a die. Then, the axle box preform 51 is subjected to machine work. Thus, the axle box main body 11 is formed. Hereinafter, the structure of the axle box preform 51 produced through the casting step will be explained.

Figure 6:
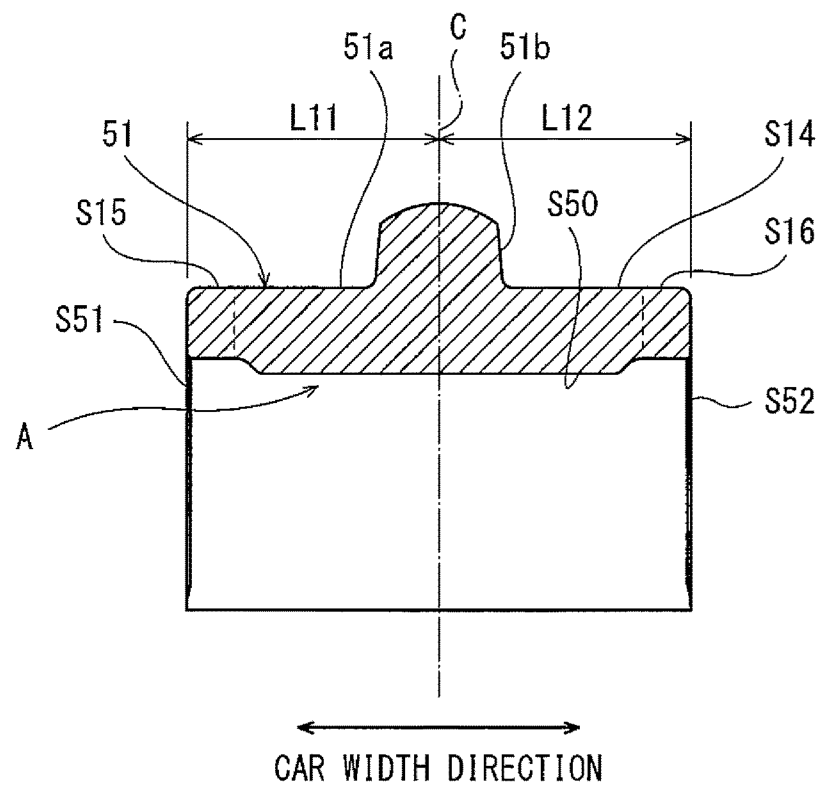
FIG. 6 is a sectional view of an axle box preform molded in a casting step (and corresponds to a sectional view taken along line III-III of FIG. 2).
Figure 7:
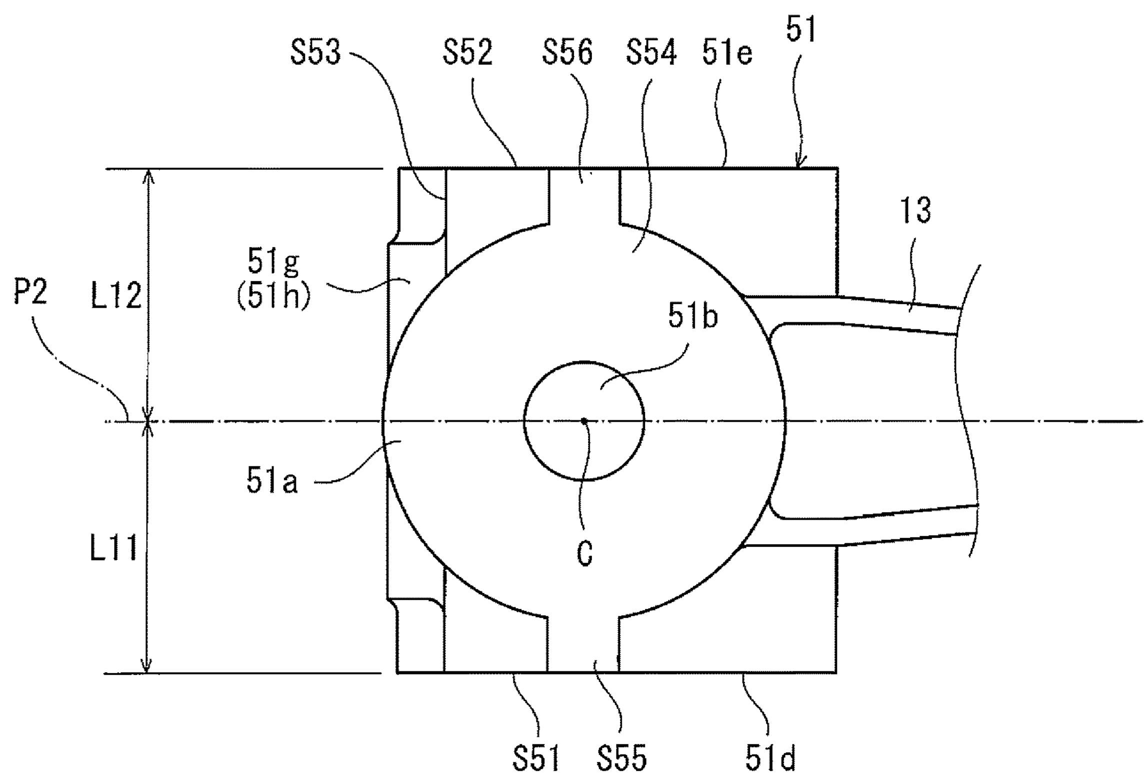
FIG. 7 is a top view of the axle box preform shown in FIG. 6 (and corresponds to a diagram when viewed from a direction indicated by an arrow IV of FIG. 2.

FIG. 6 is a sectional view of the axle box preform 51 molded in the casting step (and corresponds to a sectional view taken along line III-III of FIG. 2). FIG. 7 is a top view of the axle box preform 51 (and corresponds to a diagram when viewed from a direction indicated by an arrow IV of FIG. 2), As shown in FIGS. 6 and 7, the axle box preform 51 is molded in a shape symmetrical in the car width direction based on the center C of the accommodating space A accommodating the bearing 8. As described below, surfaces 850 to S52 and S54 to S56 of the axle box preform 51 are subjected to cutting in the next working step. By this cutting, surfaces having the same contour shapes as the surfaces S10 to S12 and S14 to S16 of the axle box main body 11 are formed on the axle box preform 51. Therefore, the surfaces S50 to S52 and S54 to S56 of the axle box preform 51 have cutting stocks with respect to the surfaces S10 to S12 and S14 to S16 of the axle box main body 11 that is a finished product.

In the axle box preform 51, an outer peripheral surface of a projecting portion 51*b* and fastening surfaces F of receiving seats 51*g* and 51*h* also have cutting stocks. In the working step, the outer peripheral surface of the projecting portion 51*b* and the fastening surfaces F of the receiving seats 51*g* and 51*h* are also subjected to the cutting. With this, the projecting portion 11*b* and receiving seats 11*g* and 11*h* of the axle box main body 11 are formed.

In the casting step, a flat seat surface portion 51*d* and a flat seat surface portion 51*e* are formed at a first side surface S51 of the axle box preform 51 and a second side surface S52 of the axle box preform 51, respectively, the seat surface portions 51*d* and 51*e* being the same in contour as each other. A shortest distance L11 between the first side surface S51 and the center C of the accommodating space A is equal to a shortest distance L12 between the second side surface S52 and the center C. The axle box preform 51 includes: a first horizontal surface S55 located at a car width direction outer side of a spring seat 51*a* of an upper portion of the axle box preform 51 and corresponding to the first horizontal surface S15 for the above-described chucking; and a second horizontal surface S56 located at a car width direction inner side of the spring seat 51*a* and having the same shape as the first horizontal surface S55.

On a side surface S53 located at a car longitudinal direction outer side of the accommodating space A, each of the receiving seats 51*g* and 51*h* to which the obstacle deflector 35 is attached is molded in a shape symmetrical in the car width direction based on the center C of the accommodating space A. The axle box preforms 51 each having the above shape are produced by using the common die. The axle box preform 51 has a shape symmetrical in the car width direction. Therefore, when producing a pair of axle box main bodies (hereinafter referred to as "a pair of left and right axle box main bodies") provided at both respective car width direction sides (i.e., both respective leftward/rightward direction sides) of the axle 6, the common die is used in the casting step. To be specific, regardless of the axle box main body (left hand) arranged at a left side and the axle box main body (right hand) arranged at a right side in a side view, the common axle box preforms 51 are molded in the casting step. Next, in the working step, the axle box preforms 51 are subjected to the machine work. Thus, the left-hand axle box main body and the right-hand axle box main body are formed. Hereinafter, details of the machine work in the working step will be explained. The following will explain the machine work for forming the left-hand axle box main body 11.

First, the surfaces S50 to S52 and S54 to S56 of the axle box preform 51 are subjected to the cutting to obtain the same contour shapes as the respective surfaces S10 to S12 and S14 to S16 of the axle box main body 11. Next, the first seat surface portion 51*d* of the first side surface S51 is subjected to threaded hole working by which the threaded holes for attaching the lid 15 are formed. To be specific, in the threaded hole working, prepared holes are formed on the first bottom surface portion 51*d* of the first side surface S51, and then, the internal threads 11*f* with which external threads of the bolts 16 are threadedly engaged are formed at the prepared holes. As above, by subjecting the first side surface S51 of the axle box preform 51 to the machine work, the first side surface S11 of the left-hand axle box main body 11 is formed. Since the lid 15 is provided only at the surface S11 located at a car width direction outer side of the axle box main body 11, the second seat surface portion 51*e* of the second side surface S52 that is a side surface located at a car width direction inner side of the axle box main body 11 is not subjected to the threaded hole working.

It should be noted that the steps of the machine work are not limited to these. For example, the internal threads 11*f* may be formed before the step of cutting the surface S50 of the axle box preform 51, and the order of the steps may be suitably changed.

The receiving seats 51*g* and 51*h* are also subjected to the threaded hole working, and as a result, the threaded holes 11*i* to 11*k* for attaching the obstacle deflector 35 are formed. It should be noted that any one of the threaded holes 11*j* and 11*k* located at both respective car width direction sides may not be formed depending on the arrangement position of the axle box main body 11. For example, in the left-hand axle box main body 11, the third threaded hole 11*k* located at a car width direction outer side does not have to be formed.

By the above working step, both the left-hand axle box main body 11 and the right-hand axle box main body 11 are formed from the axle box preforms 51 that are the same in shape as each other. In the axle box main body 11, a shortest distance between the first side surface S11 and the center C of the accommodating space A and a shortest distance between the second side surface S12 and the center C are substantially equal to each other in the car width direction. In the present embodiment, to reduce the weight of the axle box main body 11, a car width direction inner end portion (in the present embodiment, a leftward/rightward direction right end portion) of the axle box main body 11 including the second side surface S12 is partially subjected to the cutting. In this case, in the axle box main body 11, a shortest distance L3 between the second side surface S12 and the center C of the accommodating space A is shorter than a shortest distance L1 between the first side surface S11 and the center C (see FIG. 3). Therefore, in the present embodiment, by the cutting for reducing the weight of the axle box main body 11, the axle box main body 11 having a shape asymmetrical in the car width direction is formed.

The axle box 10 of the bogie 1 configured as above has the following effects.

In the casting step of the steps of producing the axle box main body 11 of the axle box 10, the axle box preform 51 having a shape symmetrical in the car width direction is molded. With this, the common axle box preforms 51 can be used for producing the pair of left and right axle box main bodies 11. Therefore, the types of the axle box preform 51 can be reduced, and the cost for the dies can be reduced by communalizing the dies. On this account, the component management cost and the production cost can be reduced when producing the axle box main bodies 11.

When producing the pair of left and right axle box main bodies 11, the axle box preforms 51 each having a shape symmetrical in the car width direction are cast by the common die, and the axle box main bodies 11 can be easily produced depending on the arrangement positions of the axle box main bodies 11. Therefore, the suitable axle boxes 10 by which the component management cost and the production cost can be reduced when producing the axle box main bodies 11 can be provided.

When attaching the lid 15 to the first side surface S11 of the axle box main body 11 by the bolts 17, the axle box preform 51 having a shape symmetrical in the car width direction is molded in the casting step, and the internal threads 11*f* are formed on the first side surface S11 in the working step such that the axle box main body 11 becomes asymmetrical. With this, while reducing the cost for the dies, the axle box main body 11 having a shape asymmetrical in the car width direction can be produced.

The flat first seat surface portion 11*d* to which the lid 15 is attached is formed at the first side surface S11, and the second seat surface portion 11*e* having the same contour as the first seat surface portion 11*d* is formed at the second side surface S12. Therefore, the common die can be used for producing the pair of left and right axle box main bodies 11, and therefore, the cost for the dies can be reduced.

When reducing the weight of the axle box main body 11, the axle box preforms 51 each having a shape symmetrical in the car width direction are cast by the common die, and the car width direction end portion of the axle box preform 51 including a side surface opposite to the side surface to which the lid 15 is attached is partially subjected to the cutting. With this, the axle box main body 11 can be easily formed. Further, while reducing the cost for the dies, the axle box main body 11 having a shape asymmetrical in the car width direction can be produced.

Further, when attaching the obstacle deflector 35 to the axle box main body 11, each of the receiving seats 11*g* and 11*h* to which the obstacle deflector 35 is attached is molded in the casting step so as to have a shape symmetrical in the car width direction. Thus, the common die can be used for producing the pair of axle box main bodies 11 provided at both respective car width direction sides, and therefore, the cost for the dies can be reduced.

When forming the horizontal surface at the axle box main body 11 for chucking the axle box main body 11 by the jack of the wheel lathe apparatus used in the wheel grinding work, the horizontal surfaces S55 and S56 for the chucking are formed in the casting step at both respective car width direction sides of the spring seat 11*a* of the upper portion of the axle box preform 51. Therefore, the common die can be used for producing the pair of axle box main bodies 11 provided at both respective car width direction sides of the axle 6, and therefore, the cost for the dies can be reduced.

Embodiment 2

An axle box 210 according to Embodiment 2 is obtained by partially modifying the shape and the like of the axle box 10 according to Embodiment 1. Further, a bogie 201 including the axle box 210 according to Embodiment 2 is obtained by partially modifying the configuration and the like of the bogie frame 3 of the bogie 1 according to Embodiment 1. Hereinafter, differences of the axle box 210 of Embodiment 2 from the axle box 10 of Embodiment 1 and (differences of the bogie 201 of Embodiment 2 from the bogie 1 of Embodiment 1 will be mainly explained.

Figure 8:
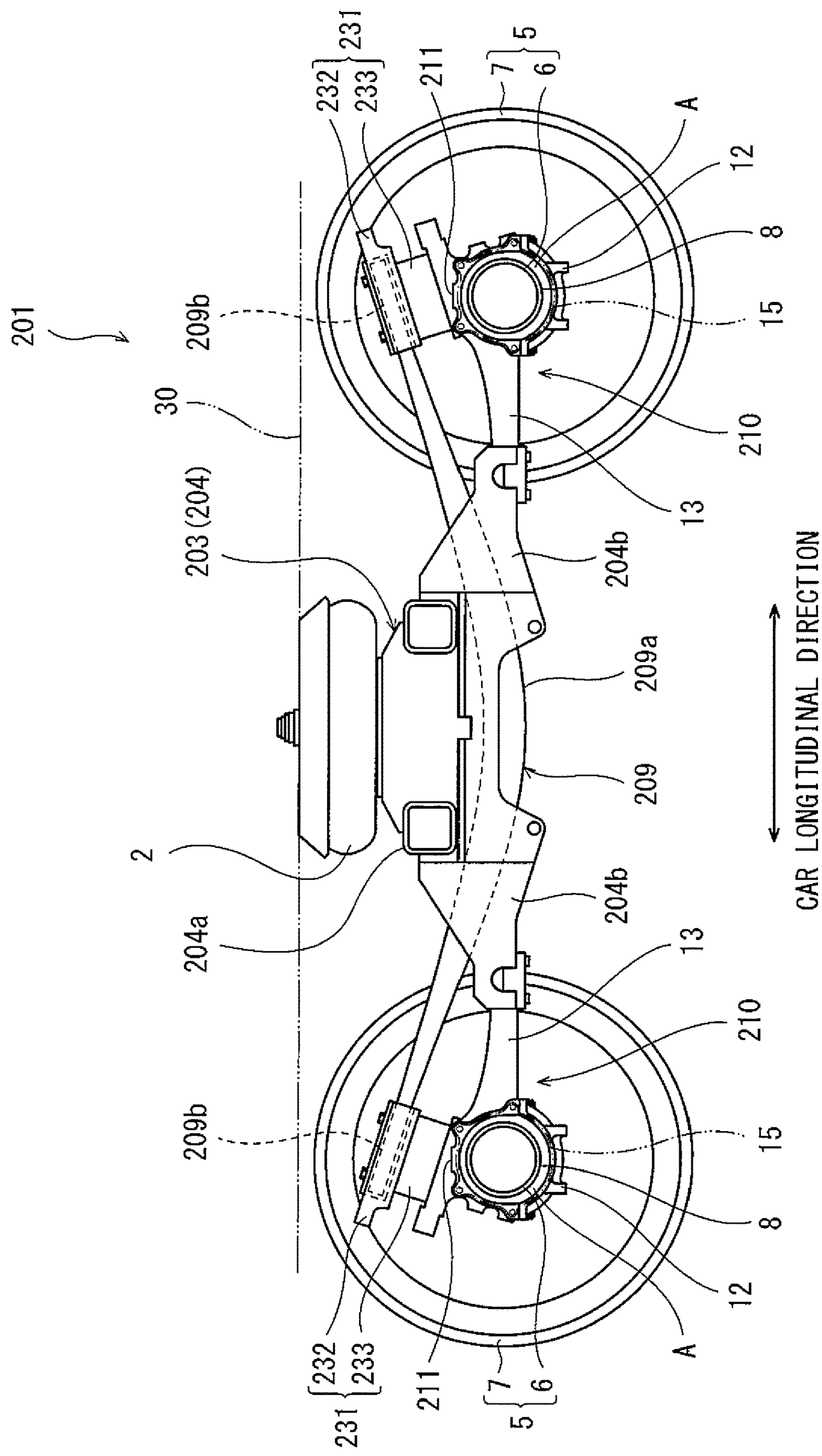
FIG. 8 is a side view of the railcar bogie including the axle box according to Embodiment 2.

FIG. 8 is a side view of the bogie 201 according to Embodiment 2. As shown in FIG. 8, a bogie frame 203 includes a cross beam 204 extending in the car width direction at a car longitudinal direction middle of the bogie 1. However, unlike the bogie frame 3 of Embodiment 1, the bogie frame 203 does not include side sills extending in the car longitudinal direction from both respective car width direction end portions 204*a* of the cross beam 204. A receiving seat 204*b* at which a tip end portion of the axle beam 13 is formed is formed at the car width direction end portion 204*a* of the cross beam 204.

Each of plate springs 209 extends between the axle box 210 and the cross beam 204 in the car longitudinal direction. Car longitudinal direction middle portions 209*a* of the plate springs 209 support both respective car width direction end portions 204*a* of the cross beam 204 from below, and car longitudinal direction end portions 209*b* of the plate springs 209 are supported by respective axle box main bodies 211. To be specific, the plate spring 209 has both the function of the axle spring nary suspension) 21 of Embodiment 1 and the function of the side sill 5 of Embodiment 1.

The car longitudinal direction end portion 209*b* of the plate spring 209 is supported by the axle box main body 211 through a supporting member 231. The supporting member 231 includes a receiving member 232 and a vibrationproof rubber 233. The receiving member 232 has a substantially rectangular shape in a plan view. The receiving member 232 includes: a bottom wall portion supporting a lower surface of the plate spring 209; and side wall portions projecting upward from both respective car longitudinal direction ends of the bottom wall portion. The vibrationproof rubber 233 is substantially columnar and is inserted between the axle box main body 211 and the receiving member 232.

Figure 9:
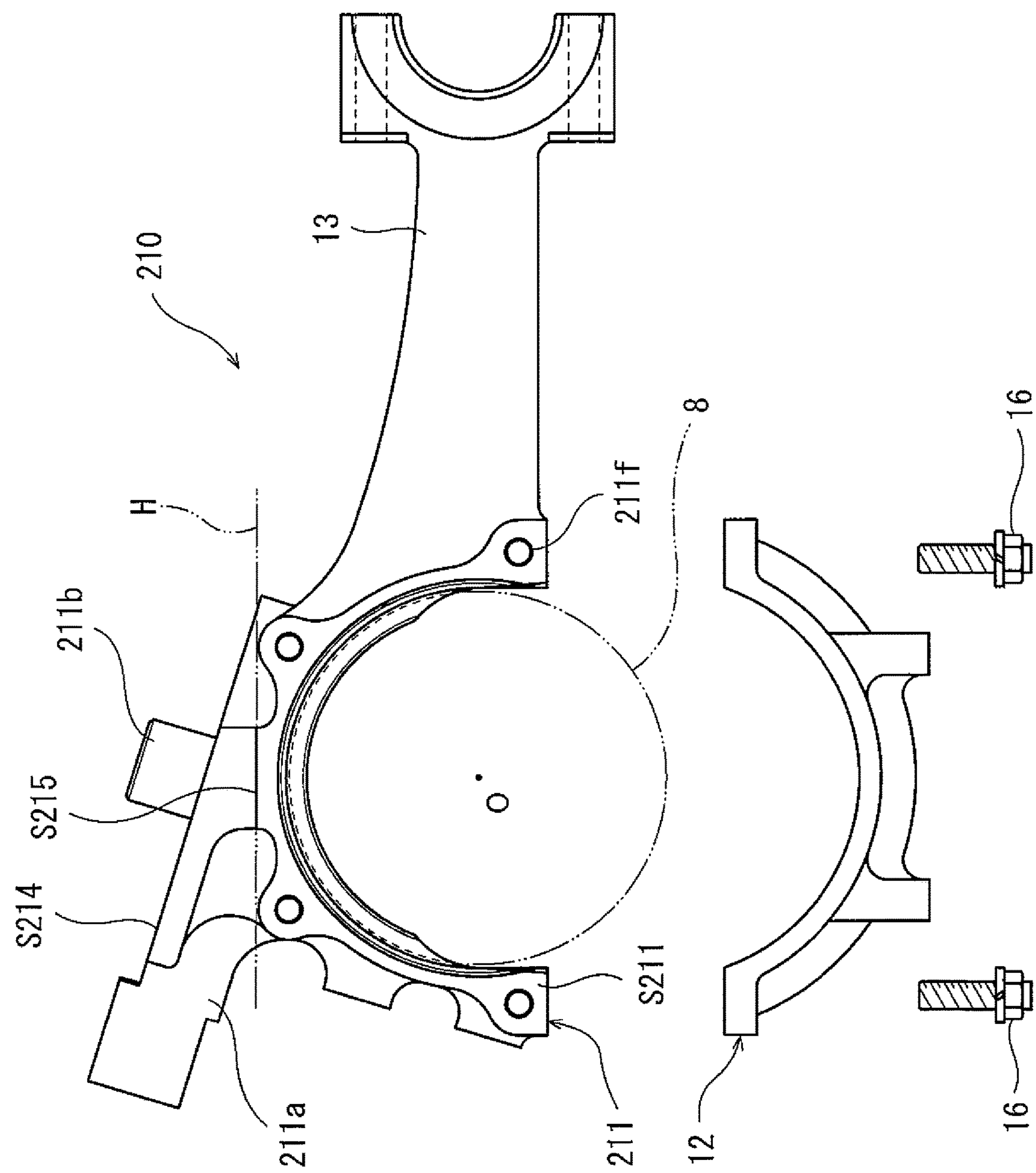
FIG. 9 is a diagram of the axle box according to Embodiment 2 and corresponds to FIG. 2.

FIG. 9 is a diagram of the axle box 210 according to Embodiment 2 and corresponds to FIG. 2. As shown in FIG. 9, the axle box main body 211 includes a spring seat 211*a*, and the spring seat 211*a* includes an upper surface S214 that is in surface contact with a lower surface of the vibrationproof rubber 233. The upper surface S214 of the spring seat 211*a* is a supporting surface supporting the plate spring 209 through the receiving member 232 and the vibrationproof rubber 233. The supporting surface S214 of the spring seat 211*a* is substantially parallel to the lower surface of the plate spring 209 and is inclined obliquely downward toward a middle side in the car longitudinal direction. A projecting portion 211*b* projecting upward from the supporting surface S214 is inserted into a through hole formed at the lower surface of the vibrationproof rubber 233 (see FIG. 8). It should be noted that the spring seat 211*a* may be formed separately from the axle box main body 211.

Figure 10:
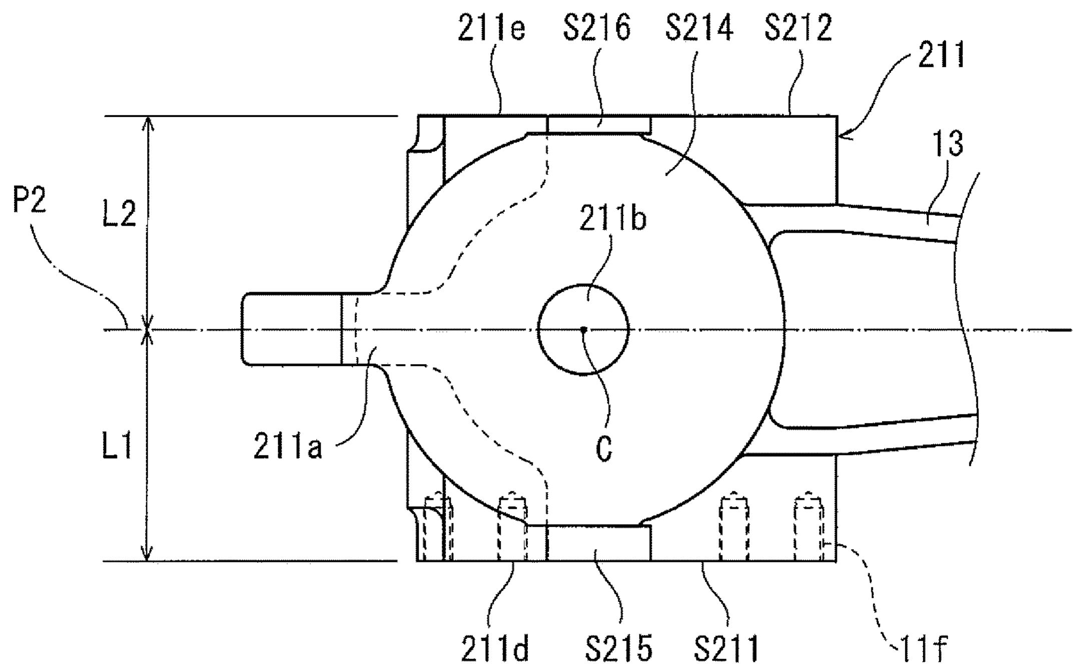
FIG. 10 is a diagram of the axle box according to Embodiment 2 and corresponds to FIG. 4.

FIG. 10 is a diagram of the axle box main body 211 according to Embodiment 2 and corresponds to FIG. 4. As shown in FIGS. 9 and 10, in the axle box main body 211, a first horizontal surface S215 and a second horizontal surface S216 are located lower than the inclined supporting surface S214. Further, as with the axle box main body 11 according to Embodiment 1, in the axle box main body 211, the lid 15 is attached only to a first side surface S211 that is a side surface located at a car width direction outer side. Therefore, a first seat surface portion 211*d* of the first side surface S211 is subjected to the threaded hole working by which threaded holes 211*f* are formed, and a second side surface S212 that is a side surface located at a car width direction inner side is not subjected to the threaded hole working.

Figure 11:
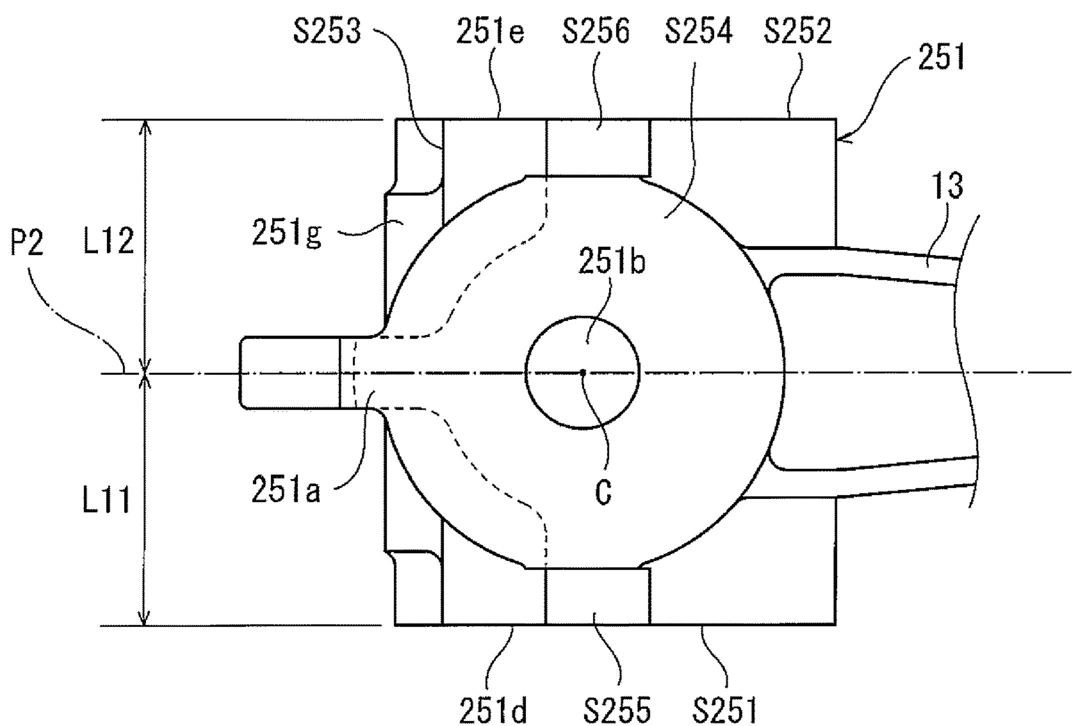
FIG. 11 is a diagram of the axle box preform according to Embodiment 2 and corresponds to FIG. 7.

FIG. 11 is a diagram of an axle box preform 251 according to Embodiment 2 and corresponds to FIG. 7. As shown in FIG. 11, the axle box preform 251 is molded in a shape symmetrical in the car width direction based on the center C of the accommodating space A as with the axle box preform 51 of Embodiment 1. Specifically, a flat seat surface portion 251*d* and a flat seat surface portion 251*e* are formed at a first side surface S251 and a second side surface S252, respectively, and are the same in contour as each other. The axle box preform 251 includes: a first horizontal surface S255 located at a car width direction outer side of a spring seat 251*a* of an upper portion of the axle box preform 251 and corresponding to the first horizontal surface S215 for the chucking; and a second horizontal surface S256 located at a car width direction inner side of the spring seat 251*a* and having the same shape as the first horizontal surface S255. Further, a receiving seat 251*g* to which the obstacle deflector is attached is molded on a side surface S253 so as to have a shape symmetrical in the car width direction based on the center C of the accommodating space A, the side surface S253 being located at a car longitudinal direction outer side of the accommodating space A.

To be specific, in the present embodiment, regardless of the left-hand axle box main body 211 and the right-hand axle box main body 211, the common axle box preform 251 is molded in the casting step. By subjecting the axle box preform 251 to the machine work described in Embodiment 1, the axle box main body 211 is formed.

Embodiment 2 described as above has the same effects as Embodiment 1. To be specific, the common axle box preforms 251 can be used for producing the left-hand axle box main body and the right-hand axle box main body. Therefore, the types of the axle box preform 251 can be reduced, and the cost for the dies can be reduced by communalizing the dies. On this account, the component management cost and the production cost can be reduced when producing the pair of left and right axle box main bodies 211. Thus, the axle box main body 211 produced from the axle box preform 251 having a shape symmetrical in the car width direction is applicable to not only the bogie 1 including the typical bogie frame 3 but also the bogie 201 including the plate spring 209.

The present invention is not limited to the above embodiments, and modifications, additions, and eliminations may be made within the scope of the present invention. The above embodiments may be combined arbitrarily. For example, some of components or methods in one embodiment may be applied to another embodiment. Further, some of components in an embodiment may be separated and extracted arbitrarily from the other components in the embodiment. In the above embodiments, the axle box (10, 210) is divided into the axle box main body (11, 211) and the cover body 12 at a position lower than the axle center O, and in a side view, the inner surface S10 of the axle box main body (11, 211) has a substantially semi-circular shape forming a part of a perfect circle. However, the above embodiments are not limited to this configuration. For example, in a side view, the inner surface of the axle box main body (11, 211) may have a completely circular shape, i.e., the accommodating space A accommodating the bearing 8 may be defined only by the inner surface of the axle box main body (11, 211).

REFERENCE SIGNS LIST

1, 201 railcar bogie
6 axle
8 bearing
10, 210 axle box
11, 211 axle box main body
11*a*, 211*a* spring seat
11*d*, 51*d* first seat surface portion (seat surface portion)
11 *e*, 51*e* second seat surface portion (seat surface portion)
11*f* internal thread
11*g*, 51*g*, 251*g* receiving seat
11*h*, 51*h* receiving seat
15 lid
35 obstacle deflector
51, 251 axle box preform
A accommodating space
S10, S50 inner surface
S11, S51 first side surface
S12, S52 second side surface
S15, S55 first horizontal surface
S16, S56 second horizontal surface

The invention claimed is:

1. A method of producing a railcar axle box, the axle box including an axle box main body accommodating a bearing supporting an axle,
the method comprising:
a casting step of molding an axle box preform by casting, the axle box preform having a shape symmetrical in a car width direction and including an accommodating space accommodating the bearing; and
a working step of subjecting the axle box preform to machine work to form the axle box main body,
wherein in the casting step, a spring seat, a first horizontal surface for chucking, and a second horizontal surface for chucking are formed at an upper portion of the axle box main body, the first horizontal surface being located at one car width direction side of the spring seat, the second horizontal surface being located at the other car width direction side of the spring seat.

2. The method according to claim 1, wherein:
in the casting step, a flat seat surface portion is formed on a first side surface of the axle box preform, and a flat seat surface portion is formed on a second side surface of the axle box preform, the first side surface being located at one car width direction side of the axle box preform, and the second side surface being located at the other car width direction side of the axle box preform;
in the working step, an internal thread is formed on the seat surface portion of the first side surface or the seat surface portion of the second side surface.

3. The method according to claim 1, wherein in the casting step, a receiving seat to which an obstacle deflector is attached is formed on a side surface of the axle box main body, the side surface being located at a car longitudinal direction outer side of the axle box main body.

4. A railcar axle box comprising an axle box main body accommodating a bearing supporting an axle,
the axle box main body including
an inner surface defining an accommodating space accommodating the bearing,
a first side surface provided at an outer side of the inner surface and at one car width direction side of a center of the accommodating space, and
a second side surface provided at the outer side of the inner surface and at the other car width direction side of the center,
a shortest distance between the first side surface and the center and a shortest distance between the second side surface and the center being equal to each other in a car width direction,
wherein the axle box main body includes:
a spring seat provided at an upper portion of the axle box main body;
a first horizontal surface for chucking, the first horizontal surface being located at one car width direction side of the spring seat; and
a second horizontal surface for chucking, the second horizontal surface being located at the other car width direction side of the spring seat.

5. The railcar axle box according to claim 4, further comprising a lid attached to the first side surface to close the accommodating space from one car width direction side, wherein:
a flat seat surface portion to which the lid is attached is formed on the first side surface; and
a seat surface portion having the same contour as the seat surface portion of the first side surface is formed on the second side surface.

6. The railcar axle box according to claim 4, wherein the axle box main body includes a receiving seat on a side surface located at a car longitudinal direction outer side of the axle box main body, an obstacle deflector being attached to the receiving seat.

* * * * *